United States Patent Office 2,815,317
Patented Dec. 3, 1957

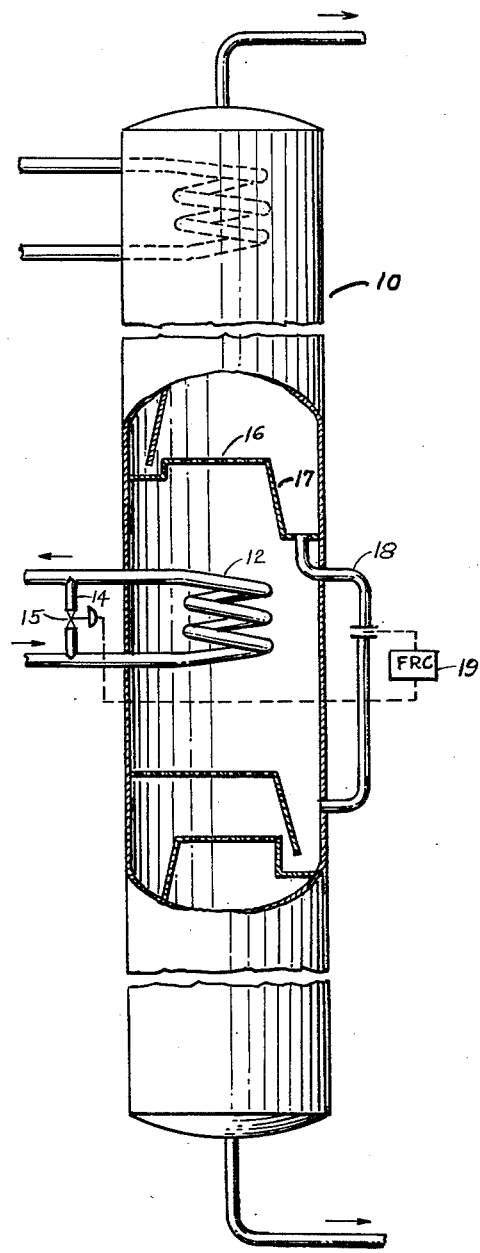
INVENTOR.
Robert L. Irvine.
BY
ATTORNEY:-

2,815,317

METHOD AND APPARATUS FOR CONTROL OF REFLUX COOLING IN FRACTIONAL DISTILLATION

Robert L. Irvine, Pittsburgh, Pa., assignor to Gulf Oil Corporation, Pittsburgh, Pa., a corporation of Pennsylvania Application December 31, 1953, Serial No. 401,684

2 Claims. (Cl. 202—40)

This invention relates to the fractional distillation of fluid mixtures and more particularly to a method and apparatus for controlling reflux cooling in a fractional distillation.

In fractionating a fluid mixture in a column provided with a fixed number of vapor-liquid contacting trays and a fixed feed tray, the operating variables for the fractionation, e. g., feed rate and composition, heat supply to the column, reflux cooling, etc., are set for values which will maintain liquid on each of the fractionating trays so that there will be countercurrent contact of liquid and vapor on each tray. If during fractionation the operating conditions become unbalanced, it is possible for one or more of the trays to run dry. When this occurs the vapors rise through the dry trays without contacting liquid and the designed degree of fractionation for the column is not obtained.

The present invention is directed to a method and apparatus for controlling side-reflux cooling in a fractionating column to ensure maintenance of liquid on the fractionating trays above the side reflux.

Side reflux involves the use of reflux or cooling agent at points below the top of the fractionating column. It offers the advantage that the tower diameter for the same capacity can be somewhat reduced because of the decrease in reflux vapor traveling to the top of the tower and the advantage that better heat exchange can be obtained with the side reflux stream than with top reflux because of its higher temperature. The present invention offers the further advantage that the control of liquid levels on the trays above the side reflux is improved.

My method in general comprises fractionating a fluid mixture in a fractionating column provided with vapor-liquid contacting trays and a side reflux cooling means, measuring the liquid downflow rate from the tray above the side reflux, and controlling the rate of reflux heat withdrawal by said side reflux cooling means in response to changes in said downflow rate of liquid from the tray above the side reflux, whereby to keep said rate substantially constant.

The apparatus of the invention in general comprises a fractionating column having vapor-liquid contacting trays and a side reflux cooling means, means for measuring the rate of flow of liquid from the tray above the side reflux and means operable by said measuring means for controlling the rate of coolant flow through said cooling means.

Further description of the method and apparatus of the invention can best be given by reference to the accompanying drawing, which shows diagrammatically and partially in section an intermediate portion of a fractionating column having a side reflux cooling coil equipped with control means in accordance with the invention.

Fractionating column 10 is shown by way of example as a column for fractionating a multi-component mixture such as crude oil into several liquid fractions and an overhead vapor fraction. The column is provided with conventional liquid-vapor contacting means such as bubble cap trays or perforated trays. At a level below the top fractionation tray and above the bottom tray the column is provided with a cooling coil 12 which performs side reflux cooling for the column.

The coolant passing through coil 12 can advantageously be the feed stream for the column so that the feed is preheated before it passes to the fired heater. The coolant inlet line for coil 12 is provided with a by-pass line 14 whereby for a constant rate of feed to the fractionating column, the rate of feed passing through coil 12 can be varied to vary the reflux cooling rate if necessary. Although, it is preferred in the interest of heat economy to use the feed liquid as the coolant in coil 12, it should be understood that any other suitable coolant can be used if desired.

In accordance with the invention, the cooling coil 12 is provided with flow control valve 15. In the drawing this valve is shown in the bypass line 14 but if a coolant other than the feed stream is used and the bypass line 14 is omitted, the valve can be in either the coolant inlet or outlet line for controlling coolant flow rate. By opening or closing valve 15 the rate of coolant flow through coil 12 can be varied and the amount of reflux heat removed from the side of column 10 can be controlled.

Immediately above coil 12 is a fractionating tray 16 which, like the other fractionating trays of the column, is provided with a down spout 17. However, in accordance with the invention, the down spout 17 for the tray above reflux cooling coil 12 is modified by the addition of a liquid conduit or line 18 which has a flow recording control device 19 capable of operating pneumatic or electronic equipment. Line 18 delivers liquid from tray 16 to a lower level in the column. The liquid can be delivered, for example, to the next lower tray below the reflux cooling coil or, as shown in the drawing, to the second lower tray if the next lower tray is used as a collecting tray.

When column 10 is placed in operation, for example, for topping crude petroleum oil, the flow recording control device 19 is set for a constant liquid downflow rate in line 18. The flow device 19, through pneumatic, electronic or other control means well known in the control instrument art, operates the flow control valve 15 for cooling coil 12. The functioning of this system of control is as follows. When, due to any changes in feed or operating conditions in the column, the liquid downflow rate in line 18 tends to decrease, the flow recording control device 19, set for constant flow rate, actuates the valve control means to decrease the rate of cooling in coil 12. In the modification of the drawing, valve 15 would be opened to pass more feed through the bypass line 14 instead of through coil 12. As a consequence of the decreased cooling at this intermediate section of the column, the rate of vapor flow to the section of the column above coil 12 increases.

The decrease in side reflux which results from decreased cooling in coil 12 must be compensated for by an increase in reflux duty at the top of the column to keep the column in heat balance and produce the desired overhead product. As more vapor rises in the column, more is condensed by the top reflux cooler which, if necessary, has its cooling rate varied to carry the added reflux duty. This can be done in any suitable manner. A convenient automatic method involves controlling the top reflux cooling to maintain a constant overhead vapor temperature. For example, the top of the column can be provided with a cooling coil similar to coil 12 through which the rate of coolant flow is adjusted by a temperature recording control which operates in response to temperature changes in the overhead vapor line. Any other suitable top refluxing method may be employed such as returning a portion of the condensed overhead vapor to the top of the column either as hot or cold reflux.

Since more vapor is permitted to rise in the column because of the reduced condensation by coil 12 and since the rate of condensation of the top coil is increased, as explained, it follows that more liquid begins to flow downwardly in the column above coil 12. Assuming that the rate of withdrawal of side streams above coil 12 remains constant, the increase of liquid downflow will check the tendency of decreasing flow rate in line 18 and the constant flow for which the flow recording control 19 is set will be maintained. For a tendency of increasing flow rate in line 18, the cooling rate in coil 12, and consequently the condensing rate, will be increased by means of the described controls to decrease the amount of vapor passing upwardly in the column above tray 16.

The method of the invention involving control of side reflux heat removal is principally suited for ensuring the maintenance of liquid level on the trays above the side reflux and it is possible for trays below the side reflux to run dry if, for example, the rate of side stream withdrawal below the side reflux becomes excessive. To prevent this any suitable means of controlling the side stream withdrawal rate or the rate of heat supplied to the bottom of the column can be employed to maintain liquid on the trays in the lower part of the column.

The drawing shows the control of side reflux cooling in response to the measurements of a flow controller in the line from the tray above the cooling coil. While it is preferred to use such a flow measuring device, it should be understood that any equivalent means for maintaining a constant flow of liquid over the outlet weir of the tray above the side reflux can also be used in the method and apparatus of the invention.

In describing the method and apparatus of the invention with reference to the embodiment shown in the drawing, I have mentioned only one particular form of side reflux, namely the hot or internal reflux which is obtained by inserting a cooling coil at a point below the top of the tower. It should be understood, however, that other refluxing methods and cooling devices can be employed. For example, instead of the coil 12, a tube bundle through which coolant is passed can be inserted in the tower. Also, the cooling means can be outside of the column. For example, side reflux can be accomplished by withdrawing a liquid stream from the side of the column, passing the stream through a cooler outside of the column which is operated at constant cooling rate and returning the cooled liquid to the column at a level one or two trays higher in the column. In such an operation the quantity of side reflux can be varied by controlling the reflux pump or a valve in the recirculating line in response to changes in the flow rate in line 18 so as to vary the amount of cooled liquid recirculated to the column.

In describing the method and apparatus of the invention I have referred specifically to a type of fractionation for which the method and apparatus of the invention are particularly well suited, namely the fractionation of a multi-component mixture such as crude oil. It should be understood, however, that the advantages of the invention can also be obtained in other wide boiling range fractionations in which side reflux is used.

Obviously many modifications and variations of the invention as hereinbefore set forth may be made without departing from the spirit and scope thereof and therefore only such limitations should be imposed as are indicated in the appended claims.

What I claim is:

1. In the fractional distillation of a fluid mixture in a fractionating column provided with vapor-liquid contacting trays the improvement which comprises withdrawing side reflux heat at a point below the top of said column measuring the rate of liquid downflow from the tray above the side reflux, and controlling the rate of withdrawal of said side reflux heat in response to changes in the liquid flow rate from the tray above the side reflux to maintain said flow rate substantially constant.

2. In a fractionating column provided with vapor-liquid contacting trays the combination which comprises a side reflux cooling means, a conduit for passing liquid from the fractionating tray above the side reflux to a lower level in the column, flow measuring means in said conduit and a flow control valve for regulating the cooling rate of said cooling means, said valve being operated by said flow measuring means to maintain a substantially constant flow rate in said conduit.

References Cited in the file of this patent

UNITED STATES PATENTS

| | | |
|---|---|---|
| Re. 17,595 | Chillas | Feb. 18, 1930 |
| 1,868,524 | De Florez | July 26, 1932 |
| 1,948,595 | Pyzel | Feb. 27, 1934 |
| 2,022,809 | Kramer | Dec. 3, 1935 |
| 2,119,786 | Kallam | June 7, 1938 |
| 2,122,764 | Wallis | July 5, 1938 |
| 2,251,771 | Wynn et al. | Aug. 5, 1941 |
| 2,357,113 | Houghland | Aug. 29, 1944 |
| 2,388,931 | Nelson | Nov. 13, 1945 |
| 2,414,371 | Fragen et al. | Jan. 14, 1947 |

OTHER REFERENCES

"Instruments and Process Control," published by New York State Vocational and Practical Arts Association, 1945, pages 155–185.